(12) United States Patent
Jones, II et al.

(10) Patent No.: US 9,684,337 B2
(45) Date of Patent: Jun. 20, 2017

(54) SMARTPHONE/TABLET STAND

(71) Applicants: Robert Jones, II, Bowie, MD (US); Wynona Mims-Jones, Bowie, MD (US)

(72) Inventors: Robert Jones, II, Bowie, MD (US); Wynona Mims-Jones, Bowie, MD (US)

( * ) Notice: Subject to any disclaimer, the term of this patent is extended or adjusted under 35 U.S.C. 154(b) by 0 days.

(21) Appl. No.: 14/831,027

(22) Filed: Aug. 20, 2015

(65) Prior Publication Data
US 2017/0052564 A1 Feb. 23, 2017

(51) Int. Cl.
*G06F 1/16* (2006.01)
*F16M 11/40* (2006.01)
*H04R 1/02* (2006.01)
*F21V 33/00* (2006.01)
*F21Y 101/02* (2006.01)

(52) U.S. Cl.
CPC ........... *G06F 1/1632* (2013.01); *F16M 11/40* (2013.01); *F21V 33/0056* (2013.01); *H04R 1/025* (2013.01); *H04R 1/028* (2013.01); *F21Y 2101/02* (2013.01)

(58) Field of Classification Search
CPC ... G06F 1/1632; F16M 11/40; F21V 33/0056; H04R 1/025; H04R 1/028; F21Y 2101/02
USPC .............. 362/86, 98, 99; 320/114, 115
See application file for complete search history.

(56) References Cited

U.S. PATENT DOCUMENTS

| 7,425,080 | B2* | 9/2008 | Lin | ............. F21V 33/0052 362/253 |
| 9,450,632 | B1* | 9/2016 | McElroy | ............. H04B 1/3877 |
| 2006/0209530 | A1* | 9/2006 | Schaak | ............. F21S 6/003 362/86 |
| 2008/0019082 | A1* | 1/2008 | Krieger | ............. B60R 11/0241 361/601 |
| 2012/0283859 | A1* | 11/2012 | Strauser | ............. G11B 31/02 700/94 |
| 2015/0016114 | A1* | 1/2015 | Marquardt | ............. F21V 21/26 362/253 |

* cited by examiner

*Primary Examiner* — Laura Tso
(74) *Attorney, Agent, or Firm* — The Law Office of Jerry D. Haynes

(57) ABSTRACT

A mounting stand for a portable electronic device that includes: a base; a pedestal at one end of a top surface of the base; an arm extending from the pedestal; a cradle at a distal end of the arm; and a audio speaker on the top surface of the base abutting the pedestal. Preferably, the base is rectangular in shape and includes a LED light surrounding the perimeter of the base. In one particular embodiment, the cradle includes side supports, a bottom support and a back support. Preferably the arm is flexible allowing rotation of the cradle. The speaker connects to a portable electronic device, where the portable electronic device includes a smartphone or a tablet.

5 Claims, 1 Drawing Sheet

SMARTPHONE/TABLET STAND

BACKGROUND OF THE INVENTION

Field of Invention

The present invention relates to a mounting stand that IS capable of mounting and supporting a tablet or alternatively a smart phone.

Description of Related Art

The use of portable electronic devices is worldwide and very prevalent in today's society. Individuals may have a smart phone, tablet and a laptop as portable electronic devices to communicate and connect to information via the internet or other communication networks. As a result many individuals are constantly using these devices for communication purposes. One unique aspect of portable electronic devices is the ability to engage in video chats in certain applications. As a result, individuals may be in a position where they are holding their electronic device in an outright position over an extended period of time. Many individuals may therefore benefit from a stand or a mounting device to mount their electronic device during a conversation, video chat or simply using the device over a long period of time. As a result various types of stands and mounting devices have been developed for use by smart phone and tablet users. However it is always advantageous to have further improved choices for mounting and supporting a tablet or a smart phone.

SUMMARY OF THE INVENTION

The present invention relates to a mounting stand for a portable electronic device that includes: a base; a pedestal at one end of a top surface of the base; an arm extending from the pedestal; a cradle at a distal end of the arm; and a audio speaker on the top surface of the base abutting the pedestal. Preferably, the base is rectangular in shape and includes a LED light surrounding the perimeter of the base. In one particular embodiment, the cradle includes side supports, a bottom support and a back support. Preferably the arm is flexible allowing rotation of the cradle. The speaker connects to a portable electronic device, where the portable electronic device includes a smartphone or a tablet.

DETAILED DESCRIPTION

The present invention relates to a mounting stand that is used to mount and support a smart phone or a tablet in a stationery position. The mounting stand according to the present invention is portable and includes a flat surface, which is preferably rectangular in shape. At one end of the stand is a cone-shaped pedestal that includes a flexible arm that extends vertically from the pedestal. This pedestal is firmly attached to the flat, rectangular base. At the distal end of the flexible arm is a cradle that is used to support and secure the tablet or smart phone in a stationery position. The flexible arm allows an individual to maneuver the electronic device into a suitable position while using the mounting stand. Further the mounting stand includes an audio speaker that is connected to the top surface of the rectangular base. This speaker may be connected to the electronic device within the cradle through a Bluetooth connection. Therefore the mounting stand provides first a support for the tablet and also a means to transfer audio communication through a speaker provided on the base. The mounting stand is portable and provides a convenient means to mount a tablet or a smart phone.

Figure 1:
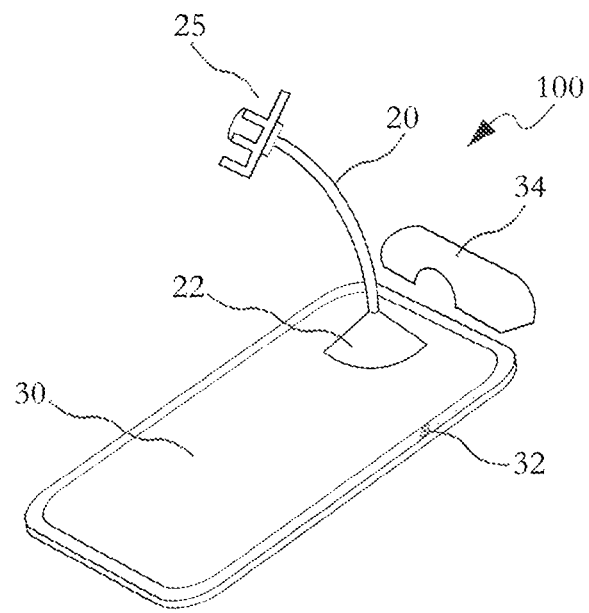
FIG. 1 provides a perspective view of a mounting stand in accordance with the present invention.
Figure 3:
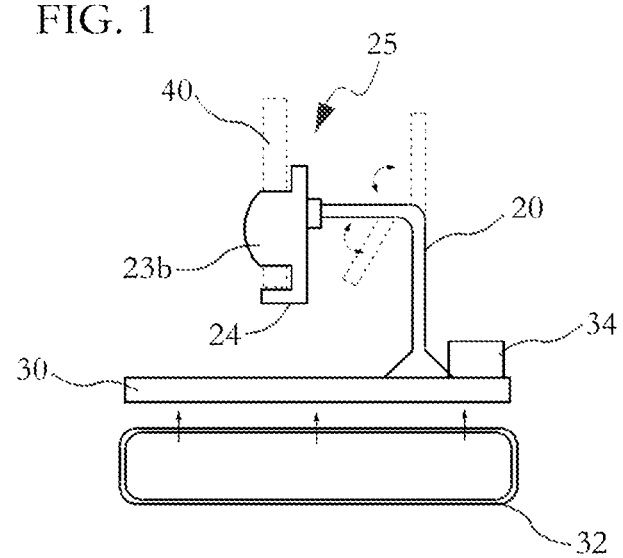
FIG. 3 depicts a side view of the mounting stand in accordance with the present invention.

In reference to FIG. 1, a mounting stand 100 in accordance with the present invention is depicted. The mounting stand 100 includes a flat base 30 that is substantially rectangular in shape. Although not limited to a rectangular shape the surface of the base 30 is preferably flat and includes LED lighting along the perimeter. The lighting 32 is shown with a power button provided along the left of the lighting. At one end of the base 30 a cone-shaped pedestal 22 is provided. The pedestal 22 includes a flexible arm 20 that extends vertically from the pedestal 22. A cradle 25 is provided at a distal end of the flexible arm 20. The cradle 25 is also shown in FIG. 3. One additional aspect of the mounting stand 100 is a speaker 34 that is placed just over the pedestal 22 on the top surface of the base 30. The speaker 34 may be connected to a tablet or smart phone that is placed in the cradle 25.

Figure 2:
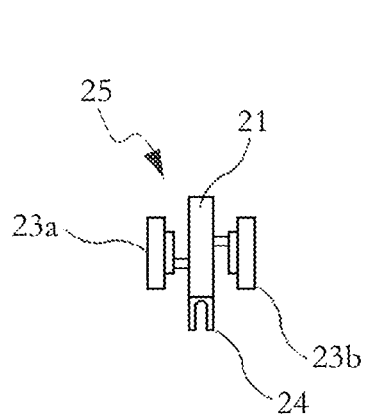
FIG. 2 depicts a front view of a cradle used with the mounting stand according to the present invention.

FIG. 2 provides a front view of the cradle 25. As shown in this front view, the cradle 25 includes side supports 23(*a*), 23(*b*) and bottom support 24. Further a back brace 21 is provided that braces the tablet or smart phone into place within cradle 25. A side view of the mounting stand 100 is provided in FIG. 3. In this side view the LED lighting 32 is separated from base 30 to show how the lighting extends around the perimeter of the base 30. Further the flexibility of the arm 20 is also depicted showing the ability of the arm to rotate into a suitable position. Also shown in FIG. 3 is an electronic device 40, which may be either a tablet or a smart phone capable of being mounted within the cradle 25.

The mounting stand according to the present invention provides a portable and unique device that is able to mount a tablet, smart phone or even an MP3 player through the use of the cradle attached to the flexible arm. The mounting stand is portable and therefore may be used in various locations as needed by a user. The instant invention has been shown and described in what it considers to be the most practical and preferred embodiments. It is recognized, however, that departures may be made there from within the scope of the invention and that obvious modifications will occur to a person skilled in the art.

What is claimed is:

1. A mounting stand for a portable electronic device comprising:
   a. a base, where the base is rectangular in shape;
   b. a LED light surrounding the perimeter of the base;
   c. a pedestal at one end of a top surface of the base;
   d. an arm extending from the pedestal;
   e. a cradle at a distal end of the arm; and
   f. a audio speaker on the top surface of the base abutting the pedestal.

2. The mounting stand according to claim 1, where the cradle includes side supports, a bottom support and a back support.

3. The mounting stand according to claim 1, where the arm is flexible.

4. The mounting stand according to claim 1, where the speaker connects to a portable electronic device.

5. The mounting stand according to claim 4, where the portable electronic device includes a smartphone or a tablet.

* * * * *